(12) United States Patent
Waylett

(10) Patent No.: US 6,912,409 B2
(45) Date of Patent: Jun. 28, 2005

(54) SELF-CONTAINED MASTHEAD UNITS FOR CELLULAR COMMUNICATION NETWORKS

(75) Inventor: Nicholas S. A. Waylett, Livermore, CA (US)

(73) Assignee: InterWAVE Communications International, Ltd., Hamilton (BM)

( * ) Notice: Subject to any disclaimer, the term of this patent is extended or adjusted under 35 U.S.C. 154(b) by 831 days.

(21) Appl. No.: 09/877,303

(22) Filed: Jun. 8, 2001

(65) Prior Publication Data

US 2001/0044323 A1 Nov. 22, 2001

Related U.S. Application Data

(62) Division of application No. 09/176,380, filed on Oct. 21, 1998, now Pat. No. 6,269,255.
(60) Provisional application No. 60/062,917, filed on Oct. 21, 1997.

(51) Int. Cl.[7] ............................................... H04Q 7/20
(52) U.S. Cl. ..................... 455/562; 455/561.2; 455/349
(58) Field of Search .............................. 455/562.1, 561, 455/444, 453, 446; 343/874

(56) References Cited

U.S. PATENT DOCUMENTS

| | | | |
|---|---|---|---|
| 4,592,093 A | | 5/1986 | Ouchi et al. |
| 5,502,715 A | | 3/1996 | Penny |
| 5,548,813 A | | 8/1996 | Charas et al. |
| 5,940,046 A | * | 8/1999 | Saleem ........................ 343/872 |
| 5,991,630 A | * | 11/1999 | Charas ...................... 455/452.1 |
| 6,002,359 A | * | 12/1999 | Chen ........................... 342/352 |

FOREIGN PATENT DOCUMENTS

| | | |
|---|---|---|
| EP | 0639035 A1 | 2/1995 |
| FR | 2710195 | 3/1995 |
| GB | 2290006 | 12/1995 |
| WO | WO 96/27242 | 9/1996 |
| WO | WO 96/38878 | 12/1996 |

* cited by examiner

*Primary Examiner*—Nay Maung
*Assistant Examiner*—Angelica Perez
(74) *Attorney, Agent, or Firm*—Dorsey & Whitney LLP

(57) ABSTRACT

An improved modular masthead for use in cellular communications networks is described. The masthead unit includes a power amplifier, a duplexer and a local power supply that supplies the power amplifier. The power amplifier is arranged to amplify outgoing communication signals received from a base station. In a preferred embodiment, the masthead also includes a low noise amplifier for amplifying incoming communication signals and passing the amplified incoming communication signals to an associated base station. With this arrangement, the masthead forms a modular unit that is distinct from the base station such that the modular masthead may be replaced independently of the base station. With this arrangement the range of a cell within a cellular network may be changed by simply swapping an existing masthead unit with a second masthead unit having a different power supply thereon and making software changes in the system. Thus, the range of the cell within the cellular network may be changed without changing any hardware in the base station.

3 Claims, 5 Drawing Sheets

SELF-CONTAINED MASTHEAD UNITS FOR CELLULAR COMMUNICATION NETWORKS

This application is a divisional application of U.S. patent application Ser. No. 09/176,380, filed Oct. 21, 1988 now U.S. Pat. No. 6,260,255 which claims priority from U.S. Provisional Patent Application Ser. No. 60/062,917 filed Oct. 21, 1997, both of which are incorporated herein by reference.

BACKGROUND OF THE INVENTION

The present invention relates generally to masthead units for base stations used in cellular communication networks. More particularly, a self-contained modular masthead unit and methods for changing the cell size by swapping masthead units are described.

The popularity of cellular telephones has been increasing dramatically in recent years. With the increased demand for cellular services, there has been an explosive growth in the infrastructure that is required to support these cellular services. Most cellular networks are organized substantially as illustrating in FIG. 1. As seen therein, a mobile switching center (MSC) 10 communicates with a plurality of base station controllers 12 which in turn each communicate with one or more base stations 14. The base stations 14 are directly coupled to one or more antennas (transceivers) 16 and are responsible for transmitting or receiving the radio signals that are used to support cellular communications. The mobile switching center 10 operates as the nerve center for the entire network and communicates with the base station controllers (BSC) 12 by an established protocol. There are a variety of different protocols that have been defined for cellular services, as for example, the GSM (Global Systems for Mobile Communications) protocol, the CDMA (Code Division Multiple Access) and the TDMA (Time Division Multiple Access) protocols. These various protocols dictate the nature of the communications between the MSC, the BSCs, and the BTSs and are well known to those skilled in the art.

Conventional base station controllers are primarily responsible for dictating the size of the associated cell. That is, the area that is covered by a particular base station. There are no fixed specifications as to the size of the cells, but in current usage, it is common to refer to macro cells, mini cells, and micro cells. The range of the various cells tends to vary with their size and by way of example in current usage, macro cells typically have antennas that output on the order of 20–50 watts of energy and tend to have ranges on the order of 5–40 kilometers. Mini cells typically have power outputs on the order of 10 watts and corresponding ranges in the vicinity of 2–5 kilometers. Micro cells typically have power consumption on the order of 2–8 watts with ranges of less than a kilometer or so. Of course as signal processing capabilities in antenna designs improve, the distinctions between the various sizes blurs but in concept, the cell size may always be varied.

One problem frequently encountered by systems having relatively larger cell sizes is that the antenna must be placed on a tower in order to obtain the desired range. Referring next to FIG. 2, one conventional tower arrangement will be briefly described. In the illustrated arrangement, the antenna 16 is mounted on a tower structure 20 while the associated base station 14 is located in the building structure at the base of the tower 20. If the tower 20 is relatively tall, a relatively long feed cable 22 must be provided between the base station 14 and the antenna 16. Generally the feed cable 22 includes a pair of coax cables with one of the coax cables (a transmit line) being arranged to carry the transmit signal and one of the coax cables (a receive line) being arranged to carry the receive signal.

A relatively long feed cable 22 presents a number of difficulties in terms of both signal intensity losses and the introduction of noise to the received signal. One approach to reducing the problems encountered by long feed lines is to provide a masthead unit 24 that is mounted on the tower 20 at a position relatively closer to the antenna 16. The masthead unit typically includes a duplexer that is arranged to apply the transmitted signals to the antenna and to split the received signals onto a receive line. The split received signals are then passed through a low noise amplifier which amplifies the received signals making them substantially less susceptible to degradation by noise picked up by the feed cable 22.

When the feed cable is particularly long there may be relatively significant power losses in the transmit signal carried on the transmit line as well. Accordingly, some designs have incorporated a linear power amplifier into the masthead design as well. Such power amplifiers are fed by a power supply located in the base station.

As cellular technology improves and its popularity increases there are increased needs to alter the size and/or shape of particular cells. In some cases it is desirable to increase the size of a cell to provide improved range. At the same time, in other situations it is desirable to reduce the size of a cell to permit the introduction of additional cells in order to handle higher usage. Although the present designs work well, they are not particularly modular in that if it is desirable to change the size of a cell for any reason, it is necessary to replace the entire base station 14. Since base stations are relatively expensive units it would be desirable to provide a base station architecture which permits the base station hardware to be reused even if the cell size or cell geometry needs to change.

SUMMARY OF THE INVENTION

To achieve the foregoing and other objects and in accordance with the purpose of the present invention, an improved modular masthead unit for use in cellular communications networks is provided. The modular masthead unit is configured for insertion into a communication path between the base station and the antenna. The modular masthead unit communicates with the antenna via an antenna line and communicates with a base station by distinct transmission and receiver lines. The masthead unit includes a power amplifier arranged to amplify the power of outgoing communication signals received from the base station. A duplexer is configured for electrical communication with the antenna via an antenna line and is arranged to receive the amplified transmit signals and to output the amplified transmit signals to the antenna line. The duplexer also receives incoming communication signals from the antenna line and outputs the received incoming communication signals on a receiver line that is distinct from the transmission line. A power supply is provided within the masthead unit for supplying power to the power amplifier. With this arrangement, the masthead unit forms a modular unit that is distinct from the base station such that the modular masthead unit may be replaced independently of the base station. In a preferred embodiment, the masthead unit also includes a low noise amplifier for amplifying the received incoming communication signals and passing the amplified incoming communication signals to the base station.

The masthead unit may be used in a cellular communications network that includes a mobile switching center, a base station controller that communicates with the mobile switching center and a base station that communicates with a base station controller and operates in accordance with an established cellular communications protocol such as the GSM protocol.

In a separate method aspect of the invention, a method of changing the range of a cell within a cellular network is provided. Initially, a masthead unit associated with a particular base station is replaced by a masthead unit having a different power supply and power amplifier output thereon in order to change the associated cell range. Additionally, at least one radio range parameter in an operations registry associated with a mobile switching center that controls the affected base station is also changed. With this arrangement, the range of the cell within the cellular network may be changed without changing any hardware in the base station.

DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

As described in the background section of this application, some conventional base stations used in cellular networks have utilized masthead units to amplify and possibly filter communications signals passed between a base station and its associated antenna(s). Typically, the masthead units are used in situations where there is a relatively long feed line between the base station and its associated antenna(s) since long feed lines are more susceptible to signal intensity losses and the introduction of harmful noise to the received signals. In the present application, an amplifier unit 110 is inserted into a communication path between the base station and its associated antenna(s). In many applications, the amplifier unit may take a form that will be somewhat similar to some of the conventional masthead unit designs. Accordingly, the amplifier unit 110 will generally be referred to as a masthead unit in this description. However, as will become apparent from the following description, the amplifier units 110 described herein have some significant differences from standard masthead units and they are employed in situations that are quite different then standard masthead units.

In one aspect of the invention, a standardized base station (BTS) design is provided. By way of example a suitable base station design is described in U.S. Pat. No. 5,734,699 which is incorporated herein by reference. Each base station also has an associated modular amplifier unit 110 which is configured for insertion into the communication path between a particular base station and its associated antenna(s) to provide the necessary power amplification for the transmitted signal. The use of the described architecture, which contemplates the presence of modular amplifier units has a number of advantages over conventional systems. To begin with, standardized base stations designs can be provided that are capable of servicing a wide variety of different cell sizes. This provides significant initial cost advantages since the need to build customized base station hardware for each desired cell size is eliminated. Rather, only the amplifier unit hardware needs to be redesigned. Further, in the event that it becomes desirable to either increase or decrease the size of a particular cell, all that needs to be done is swap or modify the amplifier unit and make the appropriate modifications to the software in accordance with the system's protocol. Again, this approach has a substantial cost savings compared to the conventional approach which requires the replacement of the entire base station.

Figure 1:
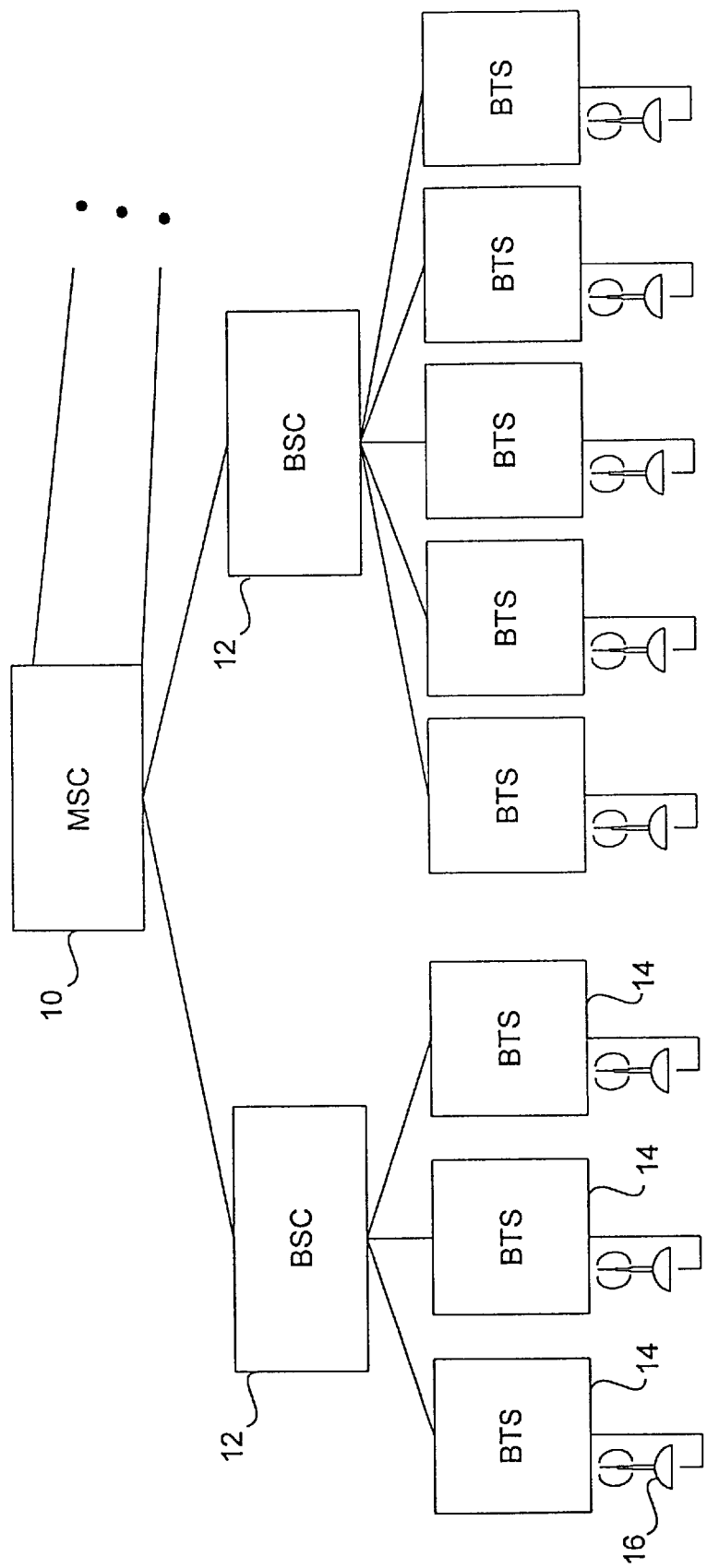
FIG. 1 is a diagrammatic representation of a simplified cellular network.
Figure 2:
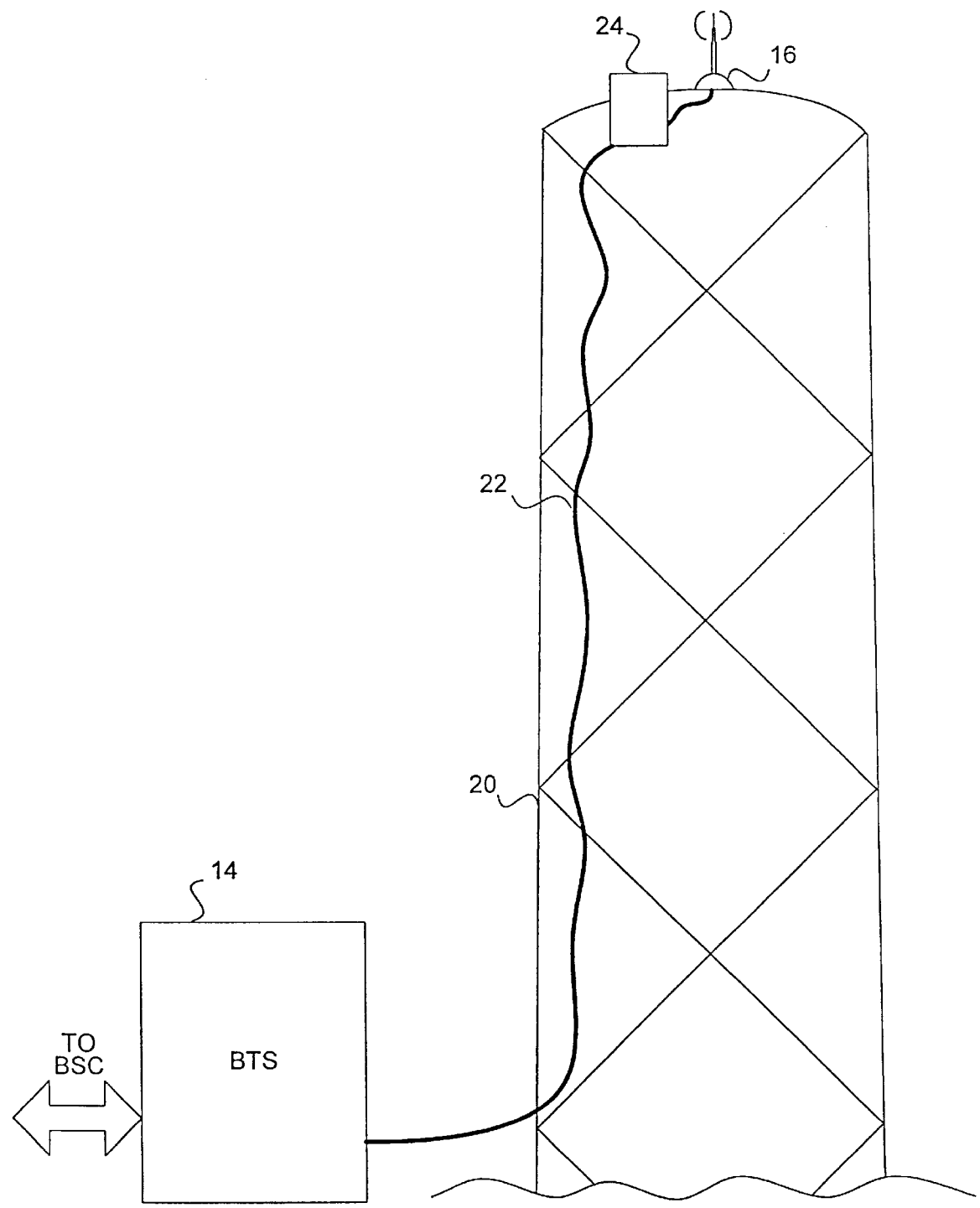
FIG. 2 is a diagrammatic representation of conventional base station arrangement which utilized a conventional masthead unit.
Figure 3:
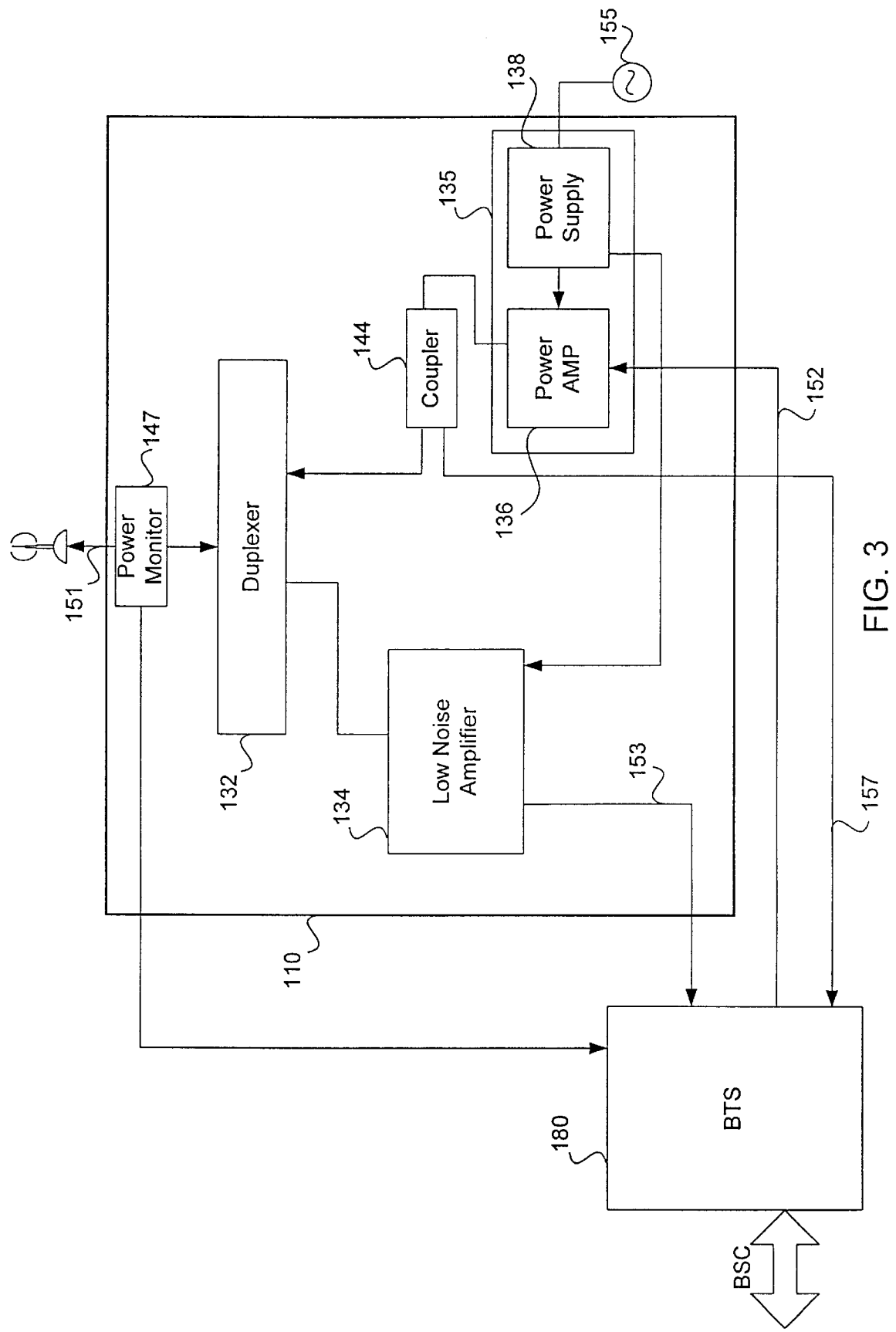
FIG. 3 is a block diagram of a modular micro-masthead unit in accordance with one embodiment of the present invention.

Referring initially to FIG. 3, a masthead (amplifier) unit 110 in accordance with one embodiment of the present invention will be described. The masthead unit 110 includes a duplexer 132, a low noise amplifier 134 and a power controller 135. The power controller 135 includes a power amplifier 136 and a power supply 138. The masthead unit may also include a coupler 144 and/or a power monitor 147. The coupler 144 is provided between the power controller 135 and the duplexer 132 and is arranged to provide a feedback signal to the base station that is indicative of the power amplified transmit signal. The power monitor 147 is coupled to the antenna line 151 and is arranged to provide a feedback signal to the base station that is indicative of forward transmit power and the power reflected by the antenna. The input lines to the masthead unit include an antenna line 151, a transmit line 152, a receiver line 153, a power line 155 and a feedback line 157. The antenna line 151 is typically a co-axial cable that electrically couples the masthead unit 110 to an antenna. The transmit and receive lines 152, 153 connect the masthead unit 110 to its associated base station 180 and carry the transmit and received signals respectively. The transmit and receive lines 152, 153 may take any suitable form, as for example co-axial cables. The power line 155 supplies power to the masthead unit. The feedback line 157 provides a feedback signal to the base station 180 that is indicative of the power amplified transmit signals detected by coupler 144 and/or the forward and reflected power detected by power monitor 147.

The duplexer 132 is arranged to apply the transmitted signal to the antenna line 151 and splits the receive signal onto a receiver line. The duplexer 132 is a relatively standard component in cellular systems and may take any suitable form as will be appreciated by those skilled in the art. By way of example, duplexers available from Airtech work well as the duplexers. The low noise amplifier 134 amplifies and filters the receive signal that is outputted from the duplexer 132. The amplified receive signal is then passed on to the base station 180. The low noise amplifier 134 may also take any suitable form and there are a number of low noise amplifiers that are currently available for use in masthead units and other devices.

The power controller 135 is designed to amplify the outgoing transmit signals received from the base station 180 to a level suitable for broadcasting. Thus, signals received over transmit line 152 are amplified and outputted to duplexer 132 where they are applied to antenna line 151. The power controller 135 includes a power amplifier 136 that amplifies the transmit signals and a power supply 138 that powers the power amplifier 136 as well as the other components of masthead unit 110. The power amplifier 136 may take any suitable form and there are currently a number of suitable power amplifiers available on the market. One difference between the amplifier unit 110 and conventional masthead units is the presence of the local power supply 138. Providing a power supply within the amplifier unit 110 makes the amplifier units 110 a relatively self-contained unit that are readily interchanged. The power supply 138 may also be a conventional design. The power line 155 supplies power to the masthead unit, and particularly to the power supply 138. Although the masthead unit can be designed to operate on a wide variety of input voltages, standard base station supply voltages and/or standard line voltages such as 110V or −48V, etc. are preferred.

The illustrated masthead unit also includes a coupler 144 positioned between the power amplifier 136 and the duplexer 132. The coupler 144 detects the intensity of the amplified transmit signal and outputs a feedback signal indicative of the transmit power. The feedback signal is applied to feedback line 157 which is coupled back to the base station 180 to facilitate monitoring and control of the transmission signals. The coupler 144 may also be a conventional design.

Figure 4:
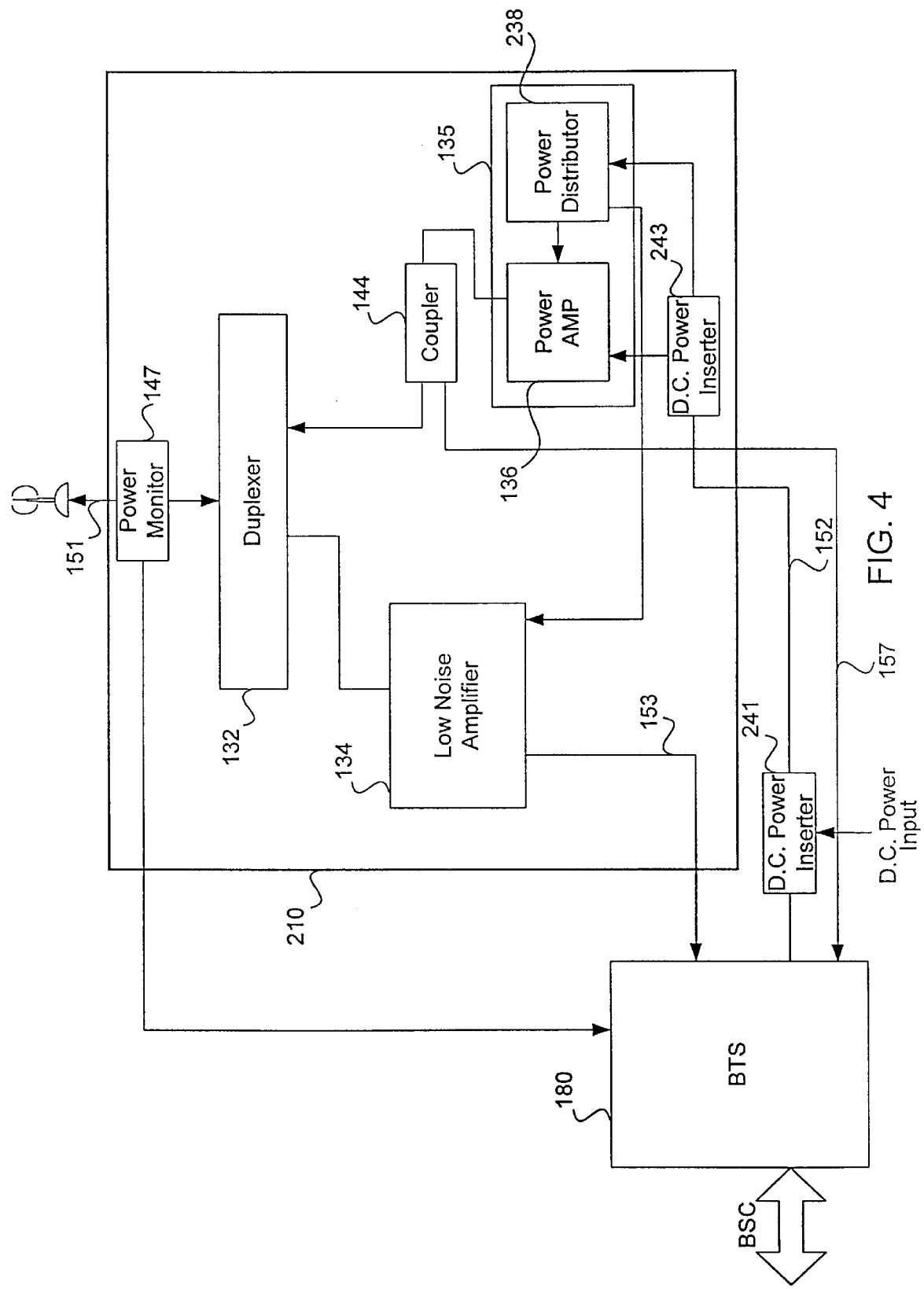
FIG. 4 is a block diagram of a modular micro-masthead unit in accordance with a second embodiment of the present invention.

Referring next to FIG. 4, a second embodiment of the masthead (amplifier) unit will be described. In this embodiment, the masthead unit 210 has a design quite similar to the design of FIG. 3. However, the power supply has been removed and power is supplied to the masthead unit over the transmit line 152. More specifically, the power controller 135 includes a power amplifier 136 and a power distributor 238. The power distributor 238 is arranged to power both the low noise amplifier 134 and the power amplifier 136. In the embodiment shown, a pair of D.C. power inserters 241, 243 are provided on the transmit line 152 in order to multiplex and demultiplex the power from the transmit line 152. More specifically, the D.C. power inserter 241 receives a D.C. power input and applies it to the transmit line at a location generally remote from the masthead unit 210. The D.C. Power inserter 243 then demultiplexes the D.C. power from the transmit signals, passing the transmit signals to power amplifier 136 and the D.C. power to power distributor 238. The power distributor 238 (which may be as simple as a connector) then provides power to power amplifier 136 and low noise amplifier 134, as well as any other components that may require power. In other respects, the masthead unit 210 may operate similarly to the previously described embodiment.

Figure 5:
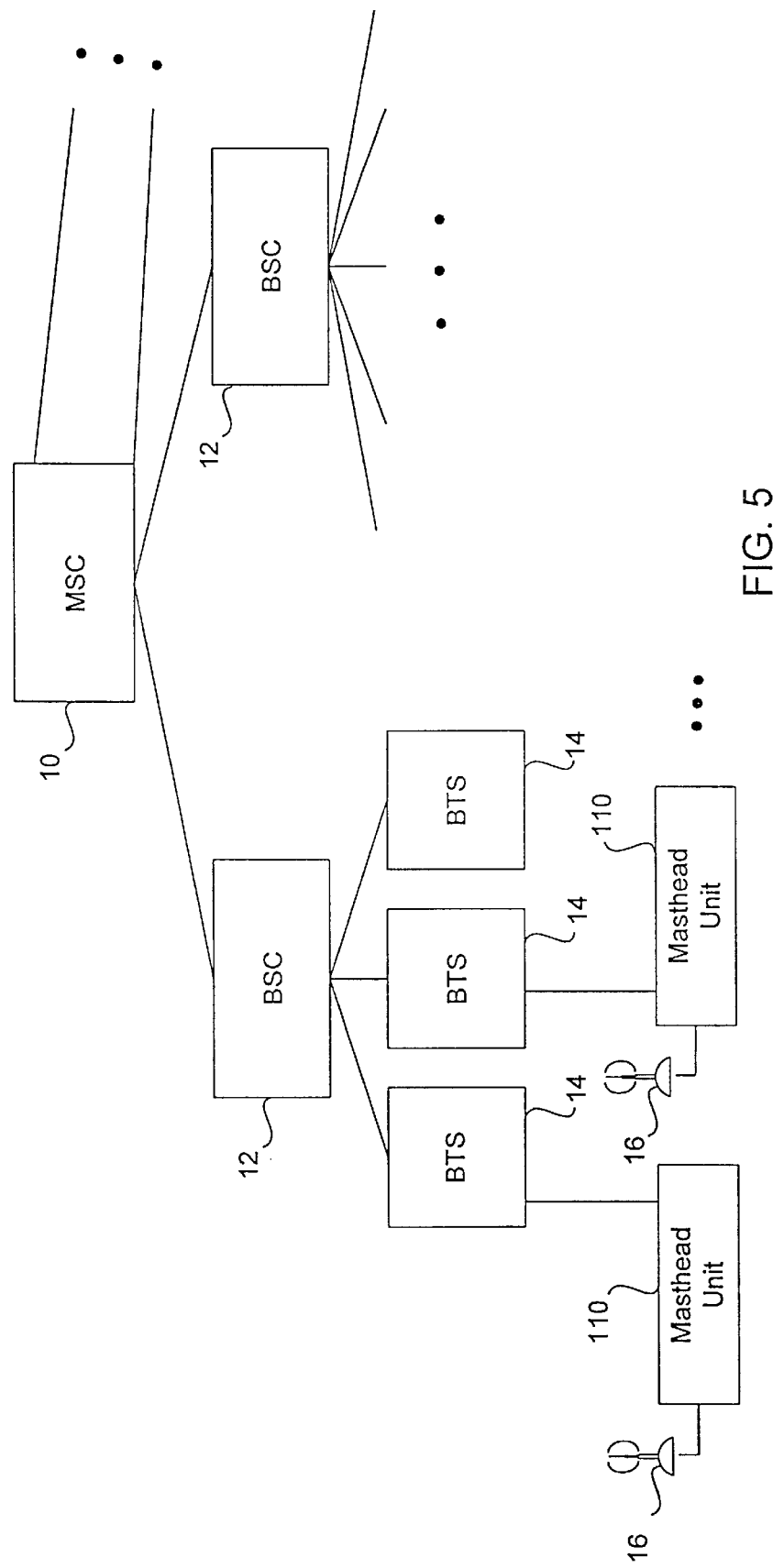
FIG. 5 is a diagrammatic representation of a simplified cellular network incorporating micro-masthead units in accordance with one embodiment of the present invention.

Referring next to FIG. 5, a cellular network incorporating amplifier units in accordance with one embodiment of the present invention will be described. As seen therein, a mobile switching center (MSC) 10 communicates with a plurality of base station controllers 12 which in turn each communicate with one or more base stations 14. Each base station 14 has at least one associated amplifier unit 110, which is directly coupled to an associated antenna (transceiver) 16. The mobile switching center, the base station controllers 12 and the base stations 14 communicate with one another by established protocols. In the described embodiment, the protocol is the GSM (Global Systems for Mobile Communications) protocol, although others may be used in alternative embodiments. The mobile switching centers and the base station controllers may be of any conventional design. The base stations may be essentially conventional, other than the fact that they do not need large power amplifiers for driving the transceivers 16 directly since masthead units 110 are provided.

It should be appreciated that the described architecture is relatively simple, but has significant advantages over conventional base station designs. One advantage of the architecture is that since the amplifier unit 110 is expected to be available to amplify the transmit signals, the base station design may be standardized. Thus, when it becomes necessary to change the size of a cell, which may be due to cell expansion, cell contractions, or cell geometry reconfiguration, all that needs to be done from a hardware standpoint is to swap a new amplifier unit 110 for an existing amplifier unit. After the amplifier unit is swapped, the software may be updated to reflect the new cell size and/or geometry.

As will be appreciated by those skilled in the art, in GSM systems, the only software change that needs to be made by an operator is to change the appropriate radio range parameter(s) in an operations registry associated with the mobile switching center (MSC) 10. Making such a change in the operations registry causes the associated base station controller 14 and base station 16 to reconfigure themselves appropriately to support the new cell.

In the embodiments described above, for the sake of simplicity, the invention has been described in the context of a single masthead unit that operates on a single radio channel in communication with a single antenna. According, the masthead unit utilizes a single duplexer, a single power amplifier on the transmit side and a single low noise amplifier on the receive side. However, as will be appreciated by those skilled in the art, in many applications it will be desirable to support transmission over multiple radio channels as well as receive diversity (i.e. reception of multiple diverse receive channels). In some circumstances, a single antenna will be used to support multiple channels, while in others circumstances, multiple antennas may be used, each antenna supporting one or more channels. In some circumstances, it will be desirable to provide a dedicated masthead unit for each channel. However, in other situations, it will be desirable to provide a single masthead unit that supports multiple channels. To support multiple transmit channels within a single masthead unit, a plurality of power amplifiers and duplexers (or potentially a multiplexer) would typically be provided within the masthead unit. To support receive diversity, a plurality of low noise amplifiers 134 may be required. Typically, transmission/rejection filters would also be provided for each channel before the duplexer in the receive path. If multiple masthead units support different channels on a single antenna, then a coupler would typically be provided on the antenna line 151. Accordingly, it should be appreciated that the configuration of the masthead units can be widely varied to meet the needs of a particular application.

Although only a few embodiments of the present invention have been described, it should be understood that the present invention may be embodied in many other specific forms without departing from the spirit or scope of the invention. Particularly, the masthead unit has been described as a single unit, however its physical structure may vary significantly. The masthead unit may be placed in a separate box to provide a self contained unit. Alternatively, where the power requirements are appropriate, it may be placed on one or two plug-in boards which may be plugged into a modular chassis having a bus for coupling components such as the chassis described in U.S. Pat. No. 5,734,699 entitled Cellular Private Branch Exchanges, which is incorporated herein by reference. In other embodiments, it may be placed in other locations as well.

In systems (particularly macro-cells) which require relatively high towers and thus relatively long cable lengths between the base station and the masthead unit, it may be desirable to include a repeater to amplify the transmit and receive signals passed between the base station and the antenna. The system has been described in the context of a system where a single antenna is used for both transmission and reception. However, as will be apparent to those skilled in the art, multiple antennas may be provided and/or distinct antennas may be provided for transmission and reception. Therefore, the present examples are to be considered as illustrative and not restrictive, and the invention is not to be limited to the details given herein, but may be modified within the scope of the appended claims.

What is claimed is:

1. A method of changing the range of a cell within a cellular network having a mobile switching center, a base station controller that communicates with the mobile switching center, a base station that communicates with the base station controller, a first mast head unit that communicates with the base station via distinct transmission and receiver lines, and an antenna that communicates with the first mast head unit via an antenna line, the method comprising:

swapping a second mast head unit for the first mast head unit, the second mast head unit having an associated cell range that is different from a cell range associated with the first mast head unit; and changing at least one radio range parameter in an operations registry associated with the mobile switching center, whereby the range of the cell within the cellular network may be changed without changing any hardware in the base station.

2. A method as recited in claim 1 wherein the cellular network operates in accordance with a GSM standard, the method further comprising:

remotely reconfiguring the base station and the base station controller in response to the change in the radio range parameter.

3. A method of upgrading a cell within a cellular network having a mobile switching center, a base station controller that communicates with the mobile switching center, a first base station that communicates with the base station controller, a mast head unit that communicates with the first base station via distinct transmission and receiver lines, and an antenna that communicates with the mast head unit via an antenna line, the method comprising:

swapping a second base station unit for the first base station without changing any hardware at the mast head unit or base station controller, whereby in the second base station communicates with the antenna through the mast head unit in the upgraded network.

* * * * *